United States Patent [19]
Orth et al.

[11] 3,960,169
[45] June 1, 1976

[54] PILOT OPERATED EVAPORATOR PRESSURE REGULATOR

[75] Inventors: Charles D. Orth, Cedarburg; Charles F. Treder, Brookfield, both of Wis.

[73] Assignee: Controls Company of America, Schiller Park, Ill.

[22] Filed: Feb. 3, 1975

[21] Appl. No.: 546,527

Related U.S. Application Data

[63] Continuation of Ser. No. 437,850, Jan. 30, 1974, abandoned.

[52] U.S. Cl............................... 137/491; 277/205
[51] Int. Cl.$^2$........................................ F16K 17/10
[58] Field of Search................ 137/489.3, 491, 375, 137/59, 60, 61, 62; 251/325, 489; 62/217; 277/205, 152, 206 R

[56] References Cited
UNITED STATES PATENTS

| | | | |
|---|---|---|---|
| 1,618,412 | 2/1927 | Dorward | 277/205 X |
| 2,686,402 | 8/1954 | Samuel | 277/205 X |
| 2,938,533 | 5/1960 | Jensen et al. | 277/205 X |
| 3,044,485 | 7/1962 | Adams et al. | 137/504 X |
| 3,114,561 | 12/1963 | Creath et al. | 277/205 X |
| 3,324,892 | 6/1967 | Aslan | 138/45 |
| 3,614,966 | 10/1971 | Orth | 137/489.3 |
| 3,810,488 | 5/1974 | Orth | 137/489.3 |
| 3,847,389 | 11/1974 | Rogers | 277/205 X |

*Primary Examiner*—Martin P. Schwadron
*Assistant Examiner*—Robert J. Miller
*Attorney, Agent, or Firm*—Michael, Best & Friedrich

[57] ABSTRACT

The interior of the bellows is sealed at atmospheric pressure so the pressure on the outside of the bellows is resisted by the atmospheric pressure within the bellows as well as by the spring. When the pressure on the outside of the bellows (which is evaporator pressure in a refrigeration system) exceeds a predetermined amount, the bellows tends to collapse and the head of the bellows pulls away from the actuating pin and allows the spring acting on the pilot valve to open the pilot valve whereupon the pressure to the right of the head of the piston is reduced, allowing the piston to move to the right against the return spring force and thus open the outlet by moving the end of the piston wall past the slot in the stationary sleeve. When the pressure falls below the desired amount, the bellows expands and moves the head of the bellows against the actuating pin to close the pilot valve. Flow through the bleed hole in the end of the piston to the pilot valve chamber rapidly raises the pressure therein so that the return spring can move the piston to close the outlet. Even with the outlet closed, the small port in the piston sleeve allows enough refrigerant flow to insure adequate flow to the compressor to keep the compressor lubricated. The bleed hole in the piston head is sized to require substantial opening of the pilot valve which, therefore, minimizes false opening of the main valve. The "Teflon" "U" cup seal around the piston serves to impose a friction load and, more important, eliminates leakage flow around the piston to prevent water droplets getting between the piston and cylinder and freezing. The plastic sleeve around the cylinder "insulates" the cylinder wall.

2 Claims, 3 Drawing Figures

PILOT OPERATED EVAPORATOR PRESSURE REGULATOR

This is a continuation of application Ser. No. 437,850, filed Jan. 30, 1974, now abandoned.

BACKGROUND OF THE INVENTION

U.S. Pat. No. 3,614,966 marked an improvement in pilot operated evaporator pressure regulator valves but was subject to impaired performance under certain conditions. Orth et al. application Ser. No. 308,029, not U.S. Pat. No. 3,810,488, improved upon the patent structure but both are subject to freeze-up in systems containing excessive moisture (about 300 ppm). Thus they operate well in a "dry" type automotive air conditioning system since the system handles refrigerant above the freezing point of water. In a "flooded" type system, however, the refrigerant is close to 0°C and water could freeze and cause malfunction of the valve.

SUMMARY OF THE INVENTION

This invention is directed to a pilot operated evaporator pressure regulator valve of the type described above but improved to prevent freeze-up. The Teflon seal prevents flow between the piston and cylinder and the cylinder wall is insulated by the plastic sleeve and "dead" space. Thus flow through the clearance space is minimized and the wall temperature is kept on the high side of 0°C. In a flooded system any flow into the clearance space would involve expansion which means a temperature drop which would cause entrained water to freeze. Thus the prevention of flow into the cylinder/piston clearance is very important in this design. The seal additionally functions to frictionally load the piston. The piston is undercut to reduce the contact area with the cylinder and minimize freezing.

The tendency for the pilot valve to freeze has been minimized by changing the valve size, the valve seat, providing a moisture trap around the seat and requiring a longer pilot valve stroke accompanied by larger spring forces to help "break" open the valve if frozen.

The overall effect of this design is the achievement of a valve which does not freeze up in a flooded system. Thus the valve has greatly increased utility over its predecessors.

DESCRIPTION OF THE PREFERRED EMBODIMENT

Figure 1:
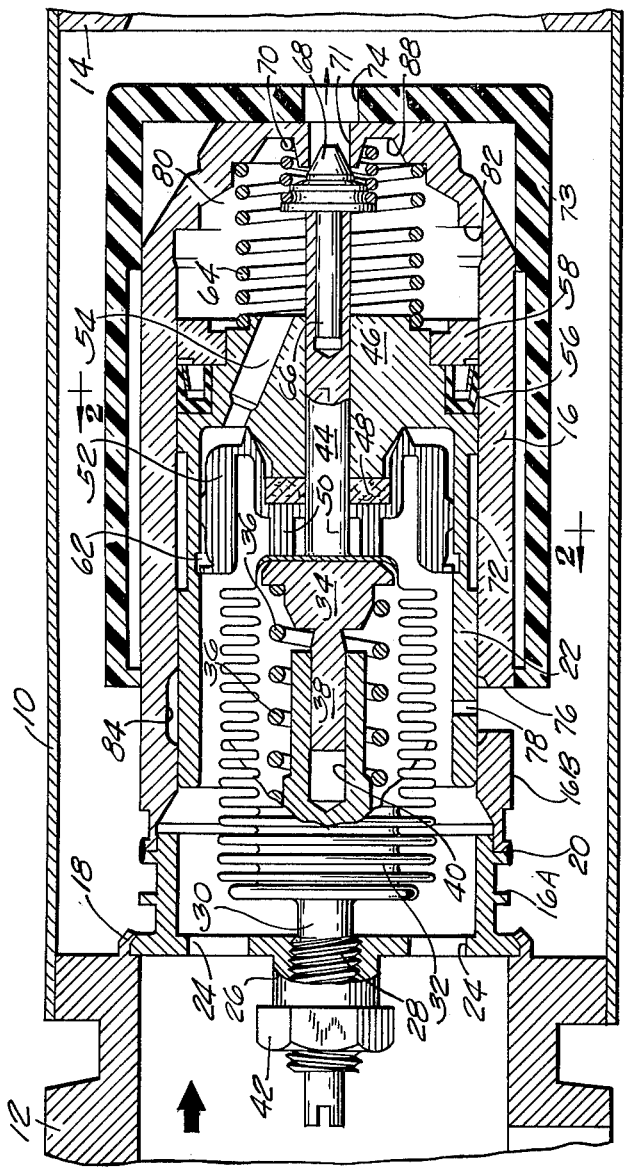
FIG. 1 is a longitudinal section through the valve.
Figure 3:
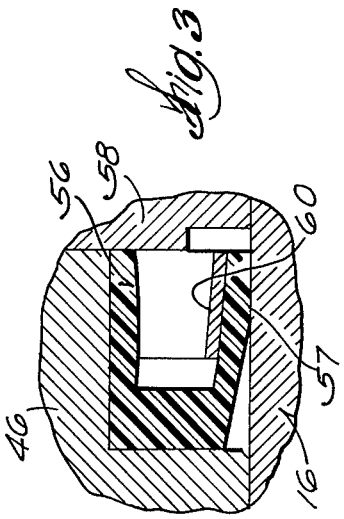
FIG. 3 is an enlarged detail of the seal.
Figure 2:
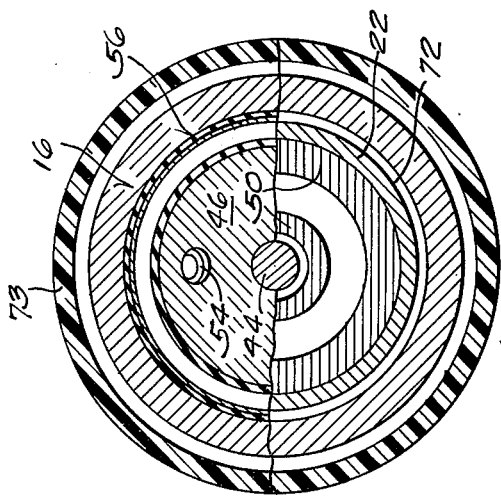
FIG. 2 is a section on line 2—2 of FIG. 1.

FIG. 1 is a longitudinal cross section through the pilot operated evaporator pressure valve enclosed in its own housing for use as a separate unit in an installation in the compressor suction line. If the valve is to be used within a compressor, the outer housing shown is not necessary since this becomes a cavity in the compressor housing.

The evaporator pressure regulator valve is enclosed in a housing having a central barrel 10 with inlet 12 and outlet 14 applied respectively to the left and right ends of the barrel. The evaporator pressure regulator includes a cylinder or sleeve 16 made up of adapter 16A and cylinder 16B and adapted to seat on the cooperating internal shoulder in inlet 12 and be held thereagainst by means of staking 18. The same sort of mounting can be used in placing the evaporator pressure regulator valve in a suitable cavity in a compressor housing.

Adapter 16A is welded to 16B at 20, this construction facilitating mounting of parts inside and to complete the assembly of what essentially amounts to a single cylinder 16 in which the piston 22 and the various other parts are mounted. Adapter 16A is provided with multiple inlet ports 24 and has a central internally threaded boss 26 through which the threaded stem 28 of the bellows support 30 projects. The bellows support has bellows 32 secured thereto with the other end of the bellows passing over pad 34 which serves as a seat for spring 36 inside the bellows. The pad has a guide stem 38 which is received in the blind hole 40 in the bellows support member. The space inside the bellows is at atmospheric pressure when it is sealed. Thus the pressure on the outside of the bellows is resisted by the atmospheric pressure within the bellows and by spring 36 and the spring effect of the bellows itself. The degree of compression of spring 36 is determined by turning the threaded stem 28 relative to the boss 26 and at the conclusion of the adjustment (which adjustment will determine the response pressure) the threaded boss 26 is crimped into the threads and the lock nut 42 is turned down tight.

The bellows assembly acts against the head of actuating pin 44 which passes through the head 56 of the piston 22. A felt wiper 48 keeps the pin 44 free of dirt and is retained in position by leg 50 which supports a filter screen 52 which prevents dirt from migrating to bleed hole 54. Member 52 seats against the piston head and is snapped into the internal groove 62. The piston is urged to the left by spring 64. The pin 44 supports the stem 66 of pilot valve 68. Spring 70 urges the valve into pin 44. Pilot valve 68 controls flow through port 71.

The right end of piston 22 is reduced to accept the U-shaped Teflon cup seal 56 with retainer 58 holding the seal in axial position. A flat ring or leaf expander spring 60 is mounted inside seal 56 to press lip 57 against the cylinder bore. Without spring 60 the lip will "cold flow" and, since Teflon has little resiliency, would not effectively function as a seal. The seal functions to prevent flow into the clearance between the piston and the cylinder. Therefore, entrained water cannot get into the clearance and freeze. In prior designs friction was deliberately introduced between the piston and cylinder. In this design the spring loaded Teflon lip gives the desired friction load . . . . low friction while uniform from valve to valve. The piston wall is undercut at 72 to give a dead space minimizing heat (cold) transfer to reduce the tendency to freeze. Finally, plastic sleeve 73 is placed over the outside of the cylinder with opening 74 aligned with pilot valve outlet 71 and its side wall undercut at 75 to create an insulating dead space.

In the position shown, the main valve is closed . . . . the skirt of piston 22 covers the slot 76 in the wall of cylinder 16. A limited amount of flow can take place through hole 78 in the piston skirt aligned with the slot 76 as shown. This insures adequate flow to the compressor to lubricate the compressor and prevent overheating of the compressor. Under the illustrated conditions, the pressure in pilot chamber 80 between the piston head and the end of the cylinder is at the same pressure as the inlet by reason of the fact that flow can occur through the bleed hole 54.

The seal 56 prevents any tendency of refrigerant in the pilot chamber 80 to flow back along the length of the piston to the outlet ports 76. As the inlet pressure builds up, it tends to collapse the bellows 32 which will cause the pad to move to the left which will allow pin 44 to also move to the left under the influence of spring 70 which has greater force than in prior designs to break the valve free if frozen to its seat. This, then, permits flow from the pilot chamber through port 71. If the opening is sufficient (greater than that permitted by the bleed 54) then the pressure drops in the pilot chamber 80 causing a pressure differential to exist across the piston head. This moves the piston head to the right against the force of spring 64. Movement of the piston to the right is limited by its engagement with piston stop 82. Movement of the piston does not affect the position of the pilot valve or the bellows. The piston more or less slides along the cylinder relative to the cylinder and pin 44. As the piston moves to the right, the piston skirt uncovers the slots 76 and allows the main flow to occur. If the evaporator pressure drops too low, the bellows 32 again expands, closes the pilot valve, and the pressure in the pilot chamber 80 builds up to allow the spring 64 to push the piston to the left and close off flow.

The proper pressure is maintained in the pilot chamber by reason of adequate bleed through bleed 54. The seal prevents back flow from chamber 80 and insures proper pressure buildup in the chamber. The provision of a known bleed hole insures against false opening and closing of the valve.

It will be noted that a groove 84 is provided leading into the slots 76. This helps flush dirt through the slots and prevents entrapment under the webs 86. Experience shows this feature to be quite important in field service.

Several other features merit attention. The seat for the pilot valve is sharp cornered to minimize seat area which could freeze. The seat is surrounded by an annular recess 88 which functions as a moisture trap.

We claim:

1. A pilot operated valve assembly comprising a cylindrical housing,
   a piston in the housing with sufficient clearance to allow the piston to move axially in the housing while dividing it into inlet and pilot chambers,
   a pilot valve in the housing end wall,
   a sealed bellows fixed on the other end wall and projecting towards the pilot valve,
   an actuating pin extending between the bellows and the pilot valve and passing through the piston head,
   a spring inside the bellows urging the free end of the bellows towards the pilot valve with a force which, when combined with the internal pressure in the bellows and the force exerted by the bellows, acts to seat the pilot valve when the pressure in the inlet chamber outside the bellows is below a predetermined value,
   a bleed hole through the piston head providing flow from the inlet chamber to the pilot chamber at a rate less than the flow rate through the pilot valve when the pilot valve is open a substantial amount and sufficient to equalize the pressures in the two chambers when the pilot valve is closed,
   a seal mounted on the piston near the piston head and frictionally engaging the interior of the cylindrical housing to prevent flow from the pilot chamber into the clearance space between the piston and housing, said seal being U-shaped plastic having low friction and being fixed relative to the piston with the open part of the seal facing the pilot chamber,
   a spring inside the seal forcing the outer lip of the seal outwardly and imposing frictional resistance to movement of the piston,
   a filter screen between the inlet chamber and the bleed hole to keep foreign matter therefrom,
   an inlet in said other end wall of the housing,
   an outlet in the side wall of the housing,
   the clearance between the piston and the housing from said housing outlet to said seal being exposed to said housing outlet only so there is not flow from the inlet chamber into the clearance,
   a second spring acting on the piston to move it to a position in which it closes off the outlet when the pilot valve is closed and the chamber pressures are equalized but which is overcome by the pressure differential across the piston head when the pilot valve is opened by reason of pressure in the inlet chamber exceeding said predetermined value and causing the bellows to collapse,
   said piston moving to uncover the outlet when the second spring has been overcome.

2. A valve according to claim 1 including a sleeve over the housing end containing the piston and pilot valve and spaced from the housing over a major portion of the sleeve length to create dead insulating space.

* * * * *